(12) United States Patent
Rathore et al.

(10) Patent No.: US 12,501,277 B2
(45) Date of Patent: Dec. 16, 2025

(54) IDENTIFICATION OF NEW GROWTH AREAS IN A TELECOMMUNICATIONS NETWORK BY IDENTIFYING AREAS WITH NO COVERAGE

(71) Applicant: Rakuten Symphony, Inc., Tokyo (JP)

(72) Inventors: Durgesh Rathore, Indore (IN); Atul Rajpoot, Indore (IN); Sudeep Kumar Jain, Indore (IN); Nilesh Bankar, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 398 days.

(21) Appl. No.: 18/018,411

(22) PCT Filed: Dec. 27, 2022

(86) PCT No.: PCT/US2022/054057
§ 371 (c)(1),
(2) Date: Jan. 27, 2023

(87) PCT Pub. No.: WO2024/144760
PCT Pub. Date: Jul. 4, 2024

(65) Prior Publication Data
US 2024/0259826 A1    Aug. 1, 2024

(51) Int. Cl.
*H04W 16/18*    (2009.01)
*H04W 16/22*    (2009.01)

(52) U.S. Cl.
CPC ........... *H04W 16/18* (2013.01); *H04W 16/22* (2013.01)

(58) Field of Classification Search
CPC .......... G06N 5/01; G06N 20/20; G06N 20/00; H04W 16/18; H04W 16/16; H04W 24/02; H04W 16/22; H04W 16/24; H04W 24/10; H04B 7/0608; H04B 7/043; H04B 7/0802; H04B 7/0617; H01Q 15/02
See application file for complete search history.

(56) References Cited

U.S. PATENT DOCUMENTS

| | | | | |
|---|---|---|---|---|
| 9,202,259 | B2 * | 12/2015 | Padwick | .................... G06T 7/30 |
| 11,528,061 | B2 * | 12/2022 | Brown | ................. H04B 7/0608 |
| 11,637,597 | B2 * | 4/2023 | Brown | ................. H04B 7/0617 |
| | | | | 375/262 |
| 2015/0126204 | A1 * | 5/2015 | Rodriguez Crespo | ....................... |
| | | | | H04W 16/30 |
| | | | | 455/446 |
| 2021/0337393 | A1 * | 10/2021 | Wainer | ..................... G06N 5/01 |

(Continued)

OTHER PUBLICATIONS

International Search Report dated Apr. 13, 2023 in International Application No. PCT/US2022/054057.

(Continued)

*Primary Examiner* — Jung Liu
(74) *Attorney, Agent, or Firm* — Sughrue Mion, PLLC

(57) ABSTRACT

A method, apparatus, and computer-readable recording medium for identifying new growth areas in a telecommunications network. The method includes obtaining first data from a first data source, obtaining second data from a second data source, combining the first data and the second data into third data, based on the third data, creating a grid including tiles having a first area and a first characteristic, and generating a new growth area polygon based on a number of the tiles having the first area and the first characteristic.

15 Claims, 6 Drawing Sheets

(56) References Cited

U.S. PATENT DOCUMENTS

2022/0329290 A1* 10/2022 Brown ................. H04B 7/0617
2022/0393723 A1* 12/2022 Brown ................. H04B 7/0608

OTHER PUBLICATIONS

Written Opinion dated Apr. 13, 2023 in International Application No. PCT/US2022/054057.

* cited by examiner

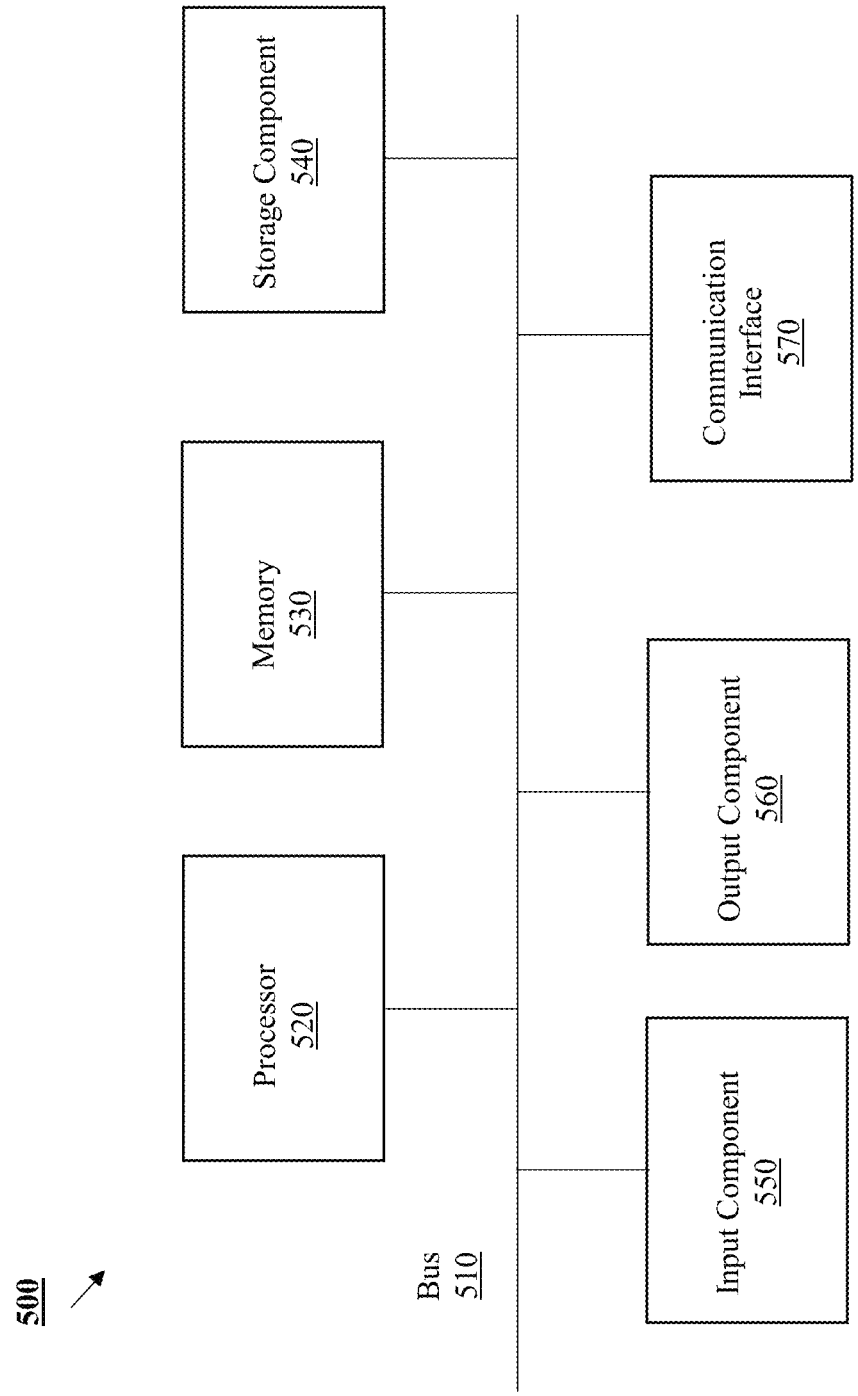

IDENTIFICATION OF NEW GROWTH AREAS IN A TELECOMMUNICATIONS NETWORK BY IDENTIFYING AREAS WITH NO COVERAGE

CROSS REFERENCE TO RELATED APPLICATIONS

This application is a National Stage of International Application No. PCT/US2022/054057 filed Dec. 27, 2022.

FIELD

Apparatuses, systems, and methods consistent with example embodiments of the present disclosure relate to identifying no-coverage areas and new growth areas for a telecommunications network, and more specifically, generating a new growth polygon area for optimizing coverage to the no-coverage areas.

BACKGROUND

A network area may include areas that have no network coverage. Areas with no network coverage downgrade the overall quality and performance of the network, and are a cause of dissatisfaction for network users or customers of a telecommunications operator. Thus, eliminating or mitigating the negative impact caused by no-coverage areas is important in order to provide reliable and high-quality network performance. Related art systems have failed to provide efficient solutions for identifying areas with no coverage and mitigating and/or eliminating no-coverage areas. Accordingly, there exists a need for improved processes for mitigating and/or eliminating no-coverage areas.

SUMMARY

According to embodiments, systems and methods are provided for identifying new growth areas and/or no-coverage areas, and more specifically, generating a polygon area for optimizing coverage to those areas.

In accordance with an aspect of the disclosure, a method, performed by at least one processor, for identifying new growth areas in a telecommunications network, includes: obtaining first data from a first data source; obtaining second data from a second data source; combining the first data and the second data into third data; based on the third data, creating a grid including tiles having a first area and a first characteristic; and generating a new growth area polygon based on a number of the tiles having the first area and the first characteristic.

The generating the new growth area polygon may include: identifying a midpoint for each edge of each tile having the first area and the first characteristic; and generating a line between the midpoint of each tile having the first characteristic and the first area.

The generating the new growth area polygon may include: identifying a midpoint for each edge of each tile having the first area and the first characteristic; generating a line between the midpoint of each tile having the first characteristic and the first area; determining an area of the new growth area polygon; and transmitting the area of the new growth area polygon to a telecommunications network operator.

The generating the new growth area polygon may include generating a line surrounding an outside edge of every tile having the first characteristic and the first area.

The generating the new growth area polygon may include generating a line surrounding an outside edge of every tile having the first characteristic and the first area; determining an area of the new growth area polygon; and transmitting the area of the new growth area polygon to a telecommunications network operator.

The first data may be drive test data and the second data may be geographic data.

The method may include transmitting the new growth area polygon to a telecommunications network operator.

The first characteristic may be being a no coverage area.

The determining the tile may be a no coverage area may include determining the tile includes an RSRP value below a predetermined threshold.

In accordance with another aspect of the disclosure, an apparatus for identifying new growth areas in a telecommunications network includes: a memory storing instructions; and at least one processor configured to execute the instructions to: obtain first data from a first data source; obtain second data from a second data source; combine the first data and the second data into third data; based on the third data, create a grid including tiles having a first area and a first characteristic; and generate a new growth area polygon based on a number of the tiles having the first area and the first characteristic.

The at least one processor may be further configured to: identify a midpoint for each edge of each tile having the first area and the first characteristic; and generate a line between the midpoint of each tile having the first characteristic and the first area.

The at least one processor may be further configured to: identify a midpoint for each edge of each tile having the first area and the first characteristic; generate a line between the midpoint of each tile having the first characteristic and the first area; determine an area of the new growth area polygon; and transmit the area of the new growth area polygon to a telecommunications network operator.

The at least one processor may be further configured to generate a line surrounding an outside edge of every tile having the first characteristic and the first area.

The at least one processor may be further configured to: generate a line surrounding an outside edge of every tile having the first characteristic and the first area; determine an area of the new growth area polygon; and transmit the area of the new growth area polygon to a telecommunications network operator.

The first data may be drive test data and the second data may be geographic data.

The at least one processor may be further configured to transmit the new growth area polygon to a telecommunications network operator.

The first characteristic may be being a no coverage area.

The at least one processor may be further configured to determine the tile includes an RSRP value below a predetermined threshold.

In accordance with another aspect of the disclosure, a non-transitory computer-readable recording medium having recorded thereon instructions executable by at least one processor, for identifying new growth areas in a telecommunications network, includes: obtaining first data from a first data source; obtaining second data from a second data source; combining the first data and the second data into third data; based on the third data, creating a grid including tiles having a first area and a first characteristic; and generating a new growth area polygon based on a number of the tiles having the first area and the first characteristic.

The non-transitory computer-readable recording medium of claim 15, wherein the generating the new growth area polygon may include: identifying a midpoint for each edge of each tile having the first area and the first characteristic; and generating a line between the midpoint of each tile having the first characteristic and the first area.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein:

FIG. 5 is a diagram of example components of a device according to an embodiment.

DETAILED DESCRIPTION

Figure 1:
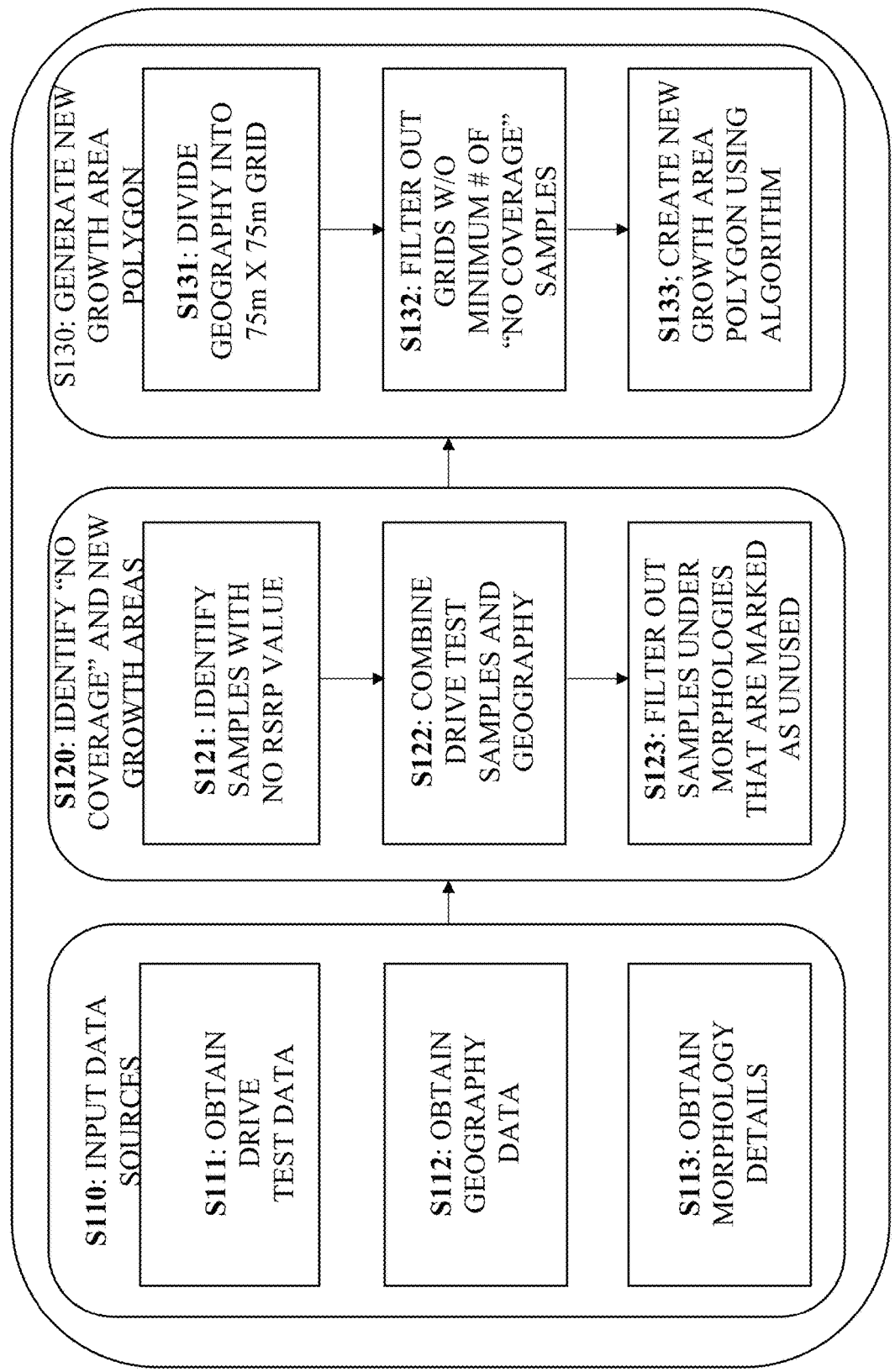
FIG. 1 is a diagram illustrating an overall process of identifying no-coverage areas and new growth areas in a telecommunications network and generating a new growth polygon area, according to an embodiment.

The following detailed description of example embodiments refers to the accompanying drawings. The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments of the present disclosure provide a method and system in which new growth areas and/or no-coverage areas are identified, and a polygon area is generated for optimizing coverage to those areas.

Provided as disclosed herein are systems, methods, and devices configured to identify no-coverage areas and new growth areas in a telecommunications network. Specifically the methods, systems, and devices provide a way to easily recommend one or more sites to address a particular service gap (e.g., an area without network coverage), and additionally determine recommended locations of the one or more recommended sites.

"No-coverage area polygon" and "new growth area polygon" may refer to a polygon generated over a smart network coverage layer, which shows one or more polygonal areas with no coverage in the network. The systems, methods and devices may generate polygons for each band periodically and provide optimization suggestions to improve the coverage, and after the optimization suggestions are implemented, track the improvements of the coverage. In some embodiments, optimization suggestions may include recommending one or more new sites and further recommending a new site location for each recommended new site.

First, a no-coverage area and/or new growth area may be identified. One or more no-coverage area and/or new growth area may be identified by generating polygons for each band. The generation of no-coverage area and/or new growth area may occur on a reoccurring basis, e.g., periodically. When identifying no-coverage area and/or new growth area, the system may utilize various inputs. One input may include a unified coverage layer. A unified coverage layer may be a smart layer generated by superimposing planning prediction data and live test data, and collecting samples from users. An updated band-wise unified coverage layer may be present. Another input may include a site database. The site database may store information for all sites in the network, including information on a latitude, a longitude, an azimuth, band details, on air status, on air date, base station (e.g., eNB) identifier (ID), an evolved universal terrestrial access network (E-UTRAN) cell global identifier (ECGI), antenna height, electrical tilt, mechanical tilt, transmission power, reference signal receive power (RSRP), etc. While the site database may include existing sites, the site database may further include sites under consideration for construction, or recommended sites. Therefore, the types of sites included in the site database is not particularly limited.

Other inputs may include clutter data, which includes information on area morphology (i.e., density of users or accesses), boundaries, which may include radio frequency (RF) cluster and region boundaries, a best server plot, which predicts coverage of a site calculated during a planning phase (e.g., generated from a prediction tool for on air sites), geo-location data, which may be collected using drive test tools such as net velocity, and may be passively collected data that has been used for a predetermined amount of time (e.g., 7 days), cell-wise preventative measurement (PM) counter key performance indicators (KPIs) such as call drop rate, radio resource control (RRC) attempts, RRC re-establishment attempts, mean control quality indicator (CQI), etc.

FIG. 1 is a diagram illustrating an overall process 100 of identifying no-coverage areas and new growth areas in a telecommunications network and generating a polygon, according to some embodiments. The process may include sub-processes such as an input retrieval sub-process S110, an identifying no-coverage areas and new growth areas sub-process S120, and a generating polygon sub-process S130.

In sub-process S110, the data sources are input that may be used to execute the algorithm. In operation S111, drive test data is obtained. In operation S112, geography data is obtained. In operation S113, morphology data is obtained.

In sub-process S120, process 100 may include identifying no-coverage areas and new growth areas. For example, in operation S121, the method may include identifying samples in the data that do not have an RSRP value and/or KPI data. For example, samples with an RSRP value below a predetermined threshold indicate there is no coverage in that area. The samples with an RSRP value above a predetermined threshold may be discarded for purposes of identifying no-coverage areas.

In operation S122, the process includes combining drive test samples and geography data to map each of the samples along with geographic data and discard any samples unrelated to the geography data. In operation S122, a map is created of coverage areas and a corresponding indication of whether there is coverage in an area.

In operation S123, the process includes filtering out all the samples under the morphologies which are marked as unused by the vendor. The remaining samples as are marked as no-coverage areas and/or new growth areas.

In sub-process S130, operation S131 includes dividing the map data from sub-process 120 into tiles in data sets of resolution of 75 meters by 75 meters per network geography. Embodiments are not limited to this size. In operation S132, the process includes checking to determine whether a minimum number of no-coverage sample count is available in the grid/tile based on a defined threshold, and discarding the remaining grids. Thus, the grids/tiles remaining may be determined as no-coverage areas and/or new growth areas. The tiles may be uniform and/or non-uniform shapes. In operation S133, the no-coverage/new growth area polygons by using a polygon generation algorithm. Example polygon generation algorithms are illustrated in FIGS. 2A and 2B below.

Figure 2A:
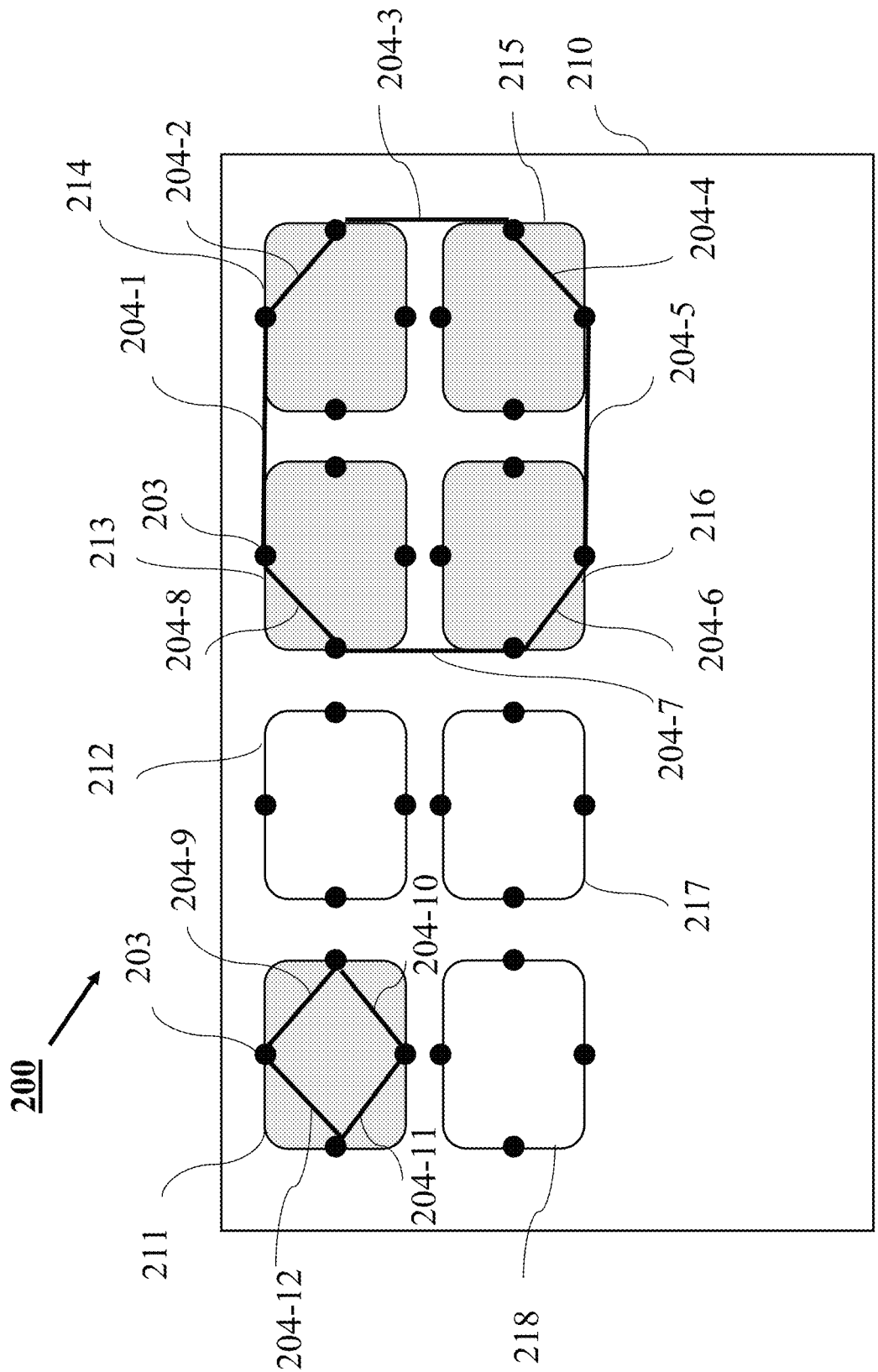
FIGS. 2A and 2B are diagrams illustrating a method of generating a new growth area polygon, according to one or more embodiments.
Figure 2B:
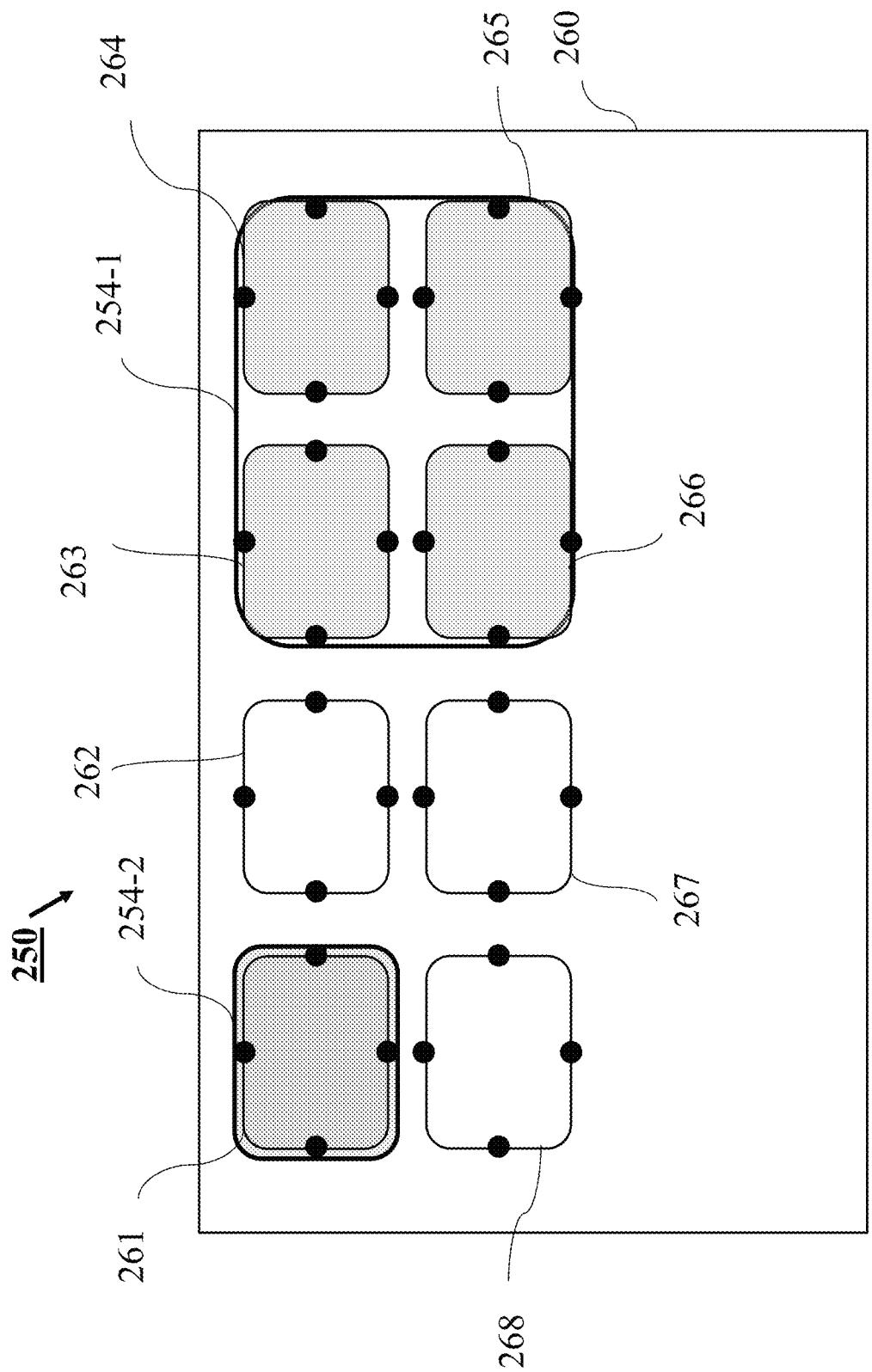

FIG. 2A is a diagram illustrating a method 200 of identifying and generating a new growth area polygon, according to an embodiment. For example, a geographic area 210 may be divided into tiles of 75 meters by 75 meters. The tiles may each have a same size, or they may have different sizes. Each of the areas of tiles 211, 212, 213, 214, 215, 216, 217, and 218, may be, for example, an area of 75 meters by 75 meters. However, this is merely an example. Embodiments are not limited to this size.

According to an embodiment, samples with RSRP below a predetermined threshold indicate there is no coverage in that area. As illustrated in FIG. 2A, the grey tiles indicate an area that is determined to have no coverage in the area. For example, For example, in FIG. 2A, tiles 211, 213, 214, 215, and 216 have been determined to be no-coverage areas. The tiles that are white (e.g., tiles 212, 217, and 218) indicate there is coverage in that area.

According to an embodiment, the algorithm for generating a polygon area includes drawing lines that connect midpoints (e.g., center) 203 of each of the edges of the tiles that are determined to have no coverage, based on a detected RSRP level. As illustrated in FIG. 2A, a first polygon that includes tiles 213 to 216 may be drawn by connecting midpoints 203 for tiles 213 to 216. For example, lines 204-1, 204-2, 204-3, 204-5, 204-6, 204-7, and 204-8 may be drawn to make a polygon having eight sides (e.g., octagon). The area of the octagon may be considered to be a no-coverage area to be provided to an operator for optimizing coverage.

A second polygon area is generated by connecting the midpoints of gray tile 211. For example, lines 204-9, 204-10, 204-11, and 204-12 may be drawn to make a polygon having four sides (e.g., diamond). The area of the diamond may be considered to be a no-coverage area to be provided to an operator for optimizing coverage.

FIG. 2B is a diagram illustrating a method 250 of identifying a new growth area polygon, according to another embodiment. For example, a geographic area 260 may be divided into several tiles of 75 meters by 75 meters. For example, each of the areas 261, 262, 263, 264, 265, 266, 267, and 268 may be 75 meters by 75 meters. However, this is merely an example size. Embodiments are not limited to this size.

According to an embodiment, the algorithm for generating a polygon area includes drawing a line that includes the total area of each of the tiles that are determined to have no coverage, based on a detected RSRP level. As illustrated in FIG. 2B, a first polygon that includes tiles 263 to 266 may be drawn around tiles 263 to 266. For example, line 254-1 may be drawn to make a polygon having four sides (e.g., rectangle). The area of the rectangle may be considered to be a no-coverage area to be provided to an operator for optimizing coverage. Additionally, the polygon corresponding to tile 261 may be drawn to have four sides (e.g., rectangle 254-2).

The above methods are merely exemplary, and embodiments are not limited to the above methods for generating polygon areas.

Figure 3:
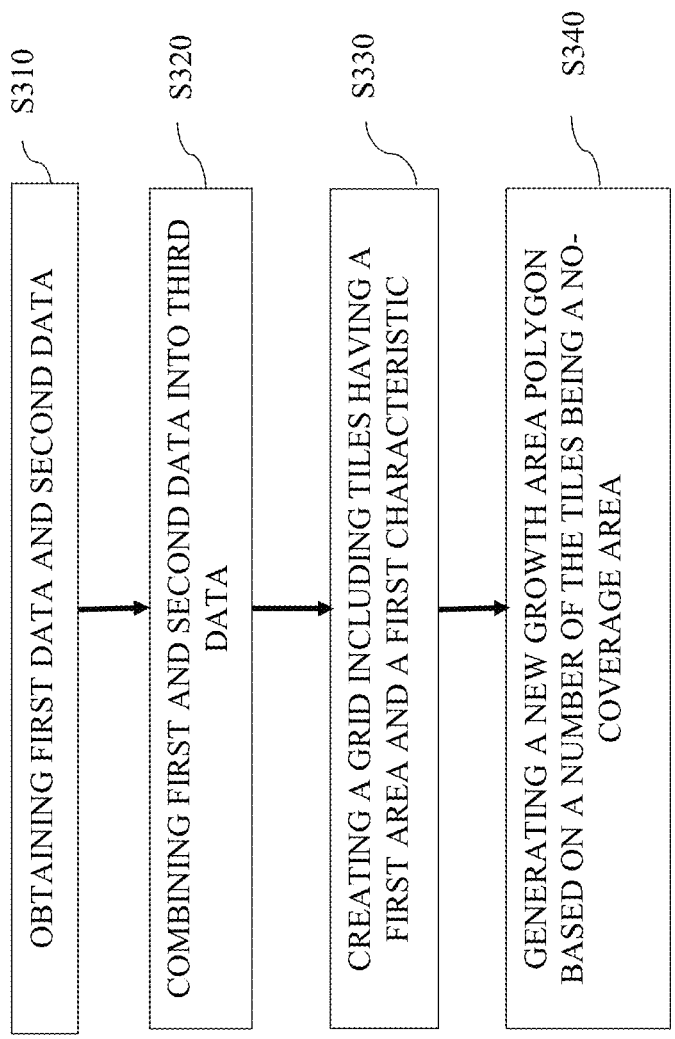
FIG. 3 is a flowchart a flowchart of a method 300 for identifying no-coverage areas and generating a polygon corresponding to the areas, according to an embodiment.

FIG. 3 is a flowchart of a method 300 for identifying no-coverage areas, and generating a new growth polygon area corresponding to the areas, according to an embodiment. In operation S310, the method includes obtaining first data and second data. The first data may be drive test data and geography data.

In operation S320, the method includes combining first data and second data into third data. Obtaining the third data may include combining drive test samples and geography data to map each of the samples along with geographic data and discard any samples unrelated to the geography data. A map may be created of coverage areas and a corresponding indication of whether there is coverage in an area.

In operation S330, the method includes creating a grid including tiles having a first area and a first characteristic. For example, creating the grid may include dividing map data into tiles in data sets of resolution of 75 meters by 75 meters per network geography. Embodiments are not limited to this size. The process may include checking to determine whether a minimum number of no-coverage sample count is available in the grid/tile based on a defined threshold, and discarding the remaining grids. The first characteristic may refer to the tile being a no-coverage area.

In operation S340, the method includes generating a new growth area polygon based on a number of the tiles being a no-coverage area. Tiles having samples with RSRP below a predetermined threshold indicate there is no coverage in that area. The algorithm for generating a polygon area is drawn by connecting midpoints (e.g., center) of each of the edges of the tiles that are determined to have no coverage, based on the detected RSRP level. For example, if there are four tiles with no-coverage areas, the midpoints may be connected to draw a polygon having eight sides (e.g., octagon). The area of the octagon may be considered to be a no-coverage area to be provided to an operator for optimizing coverage. As another example, a polygon area may be drawn by including the total area of all of the tiles that are determined to have no coverage, based on a detected RSRP level. For example, if there are four tiles with no-coverage areas, a rectangle could be drawn around the four tiles.

Figure 4:
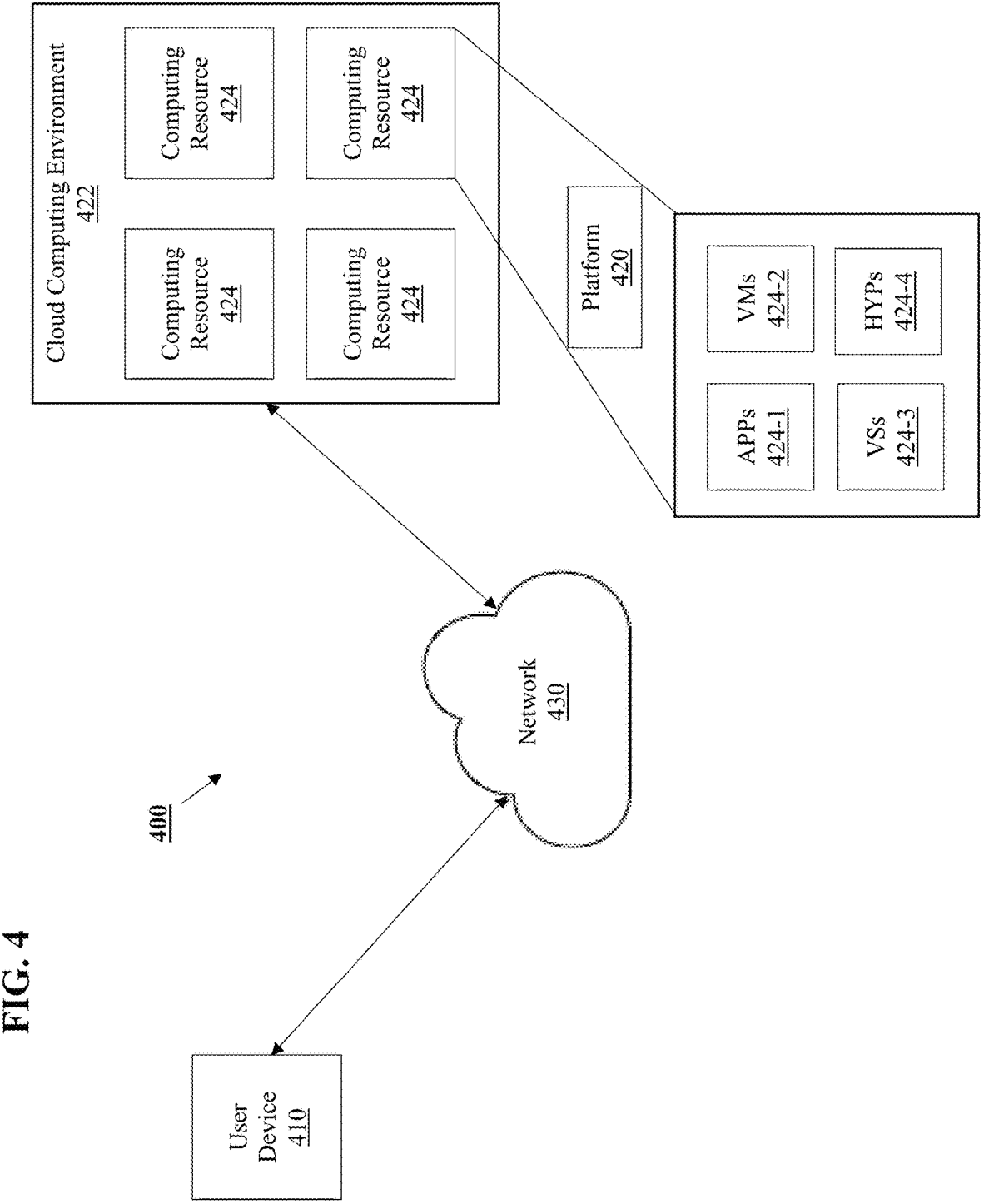
FIG. 4 is a diagram of an example environment in which systems and/or methods, described herein, may be implemented.

FIG. 4 is a diagram of an example environment 400 in which systems and/or methods, described herein, may be implemented. As shown in FIG. 4, environment 400 may include a user device 410, a platform 420, and a network 430. Devices of environment 400 may interconnect via wired connections, wireless connections, or a combination of wired and wireless connections. In embodiments, any of the functions and operations described with reference to FIG. 1 above may be performed by any combination of elements illustrated in FIG. 4.

User device 410 includes one or more devices capable of receiving, generating, storing, processing, and/or providing information associated with platform 420. For example, user device 410 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 410 may receive information from and/or transmit information to platform 420.

Platform 420 includes one or more devices capable of receiving, generating, storing, processing, and/or providing information. In some implementations, platform 420 may include a cloud server or a group of cloud servers. In some implementations, platform 420 may be designed to be modular such that certain software components may be swapped in or out depending on a particular need. As such, platform 420 may be easily and/or quickly reconfigured for different uses.

In some implementations, as shown, platform 420 may be hosted in cloud computing environment 422. Notably, while implementations described herein describe platform 420 as being hosted in cloud computing environment 422, in some implementations, platform 420 may not be cloud-based (i.e., may be implemented outside of a cloud computing environment) or may be partially cloud-based.

Cloud computing environment 422 includes an environment that hosts platform 420. Cloud computing environment 422 may provide computation, software, data access, storage, etc., services that do not require end-user (e.g., user device 410) knowledge of a physical location and configuration of system(s) and/or device(s) that hosts platform 420. As shown, cloud computing environment 422 may include a group of computing resources 424 (referred to collectively as "computing resources 424" and individually as "computing resource 424").

Computing resource 424 includes one or more personal computers, a cluster of computing devices, workstation computers, server devices, or other types of computation and/or communication devices. In some implementations, computing resource 424 may host platform 420. The cloud resources may include compute instances executing in computing resource 424, storage devices provided in computing resource 424, data transfer devices provided by computing resource 424, etc. In some implementations, computing resource 424 may communicate with other computing resources 424 via wired connections, wireless connections, or a combination of wired and wireless connections.

As further shown in FIG. 4, computing resource 424 includes a group of cloud resources, such as one or more applications ("APPs") 424-1, one or more virtual machines ("VMs") 424-2, virtualized storage ("VSs") 424-3, one or more hypervisors ("HYPs") 424-4, or the like.

Application 424-1 includes one or more software applications that may be provided to or accessed by user device 410. Application 424-1 may eliminate a need to install and execute the software applications on user device 410. For example, application 424-1 may include software associated with platform 420 and/or any other software capable of being provided via cloud computing environment 422. In some implementations, one application 424-1 may send/receive information to/from one or more other applications 424-1, via virtual machine 424-2.

Virtual machine 424-2 includes a software implementation of a machine (e.g., a computer) that executes programs like a physical machine. Virtual machine 424-2 may be either a system virtual machine or a process virtual machine, depending upon use and degree of correspondence to any real machine by virtual machine 424-2. A system virtual machine may provide a complete system platform that supports execution of a complete operating system ("OS"). A process virtual machine may execute a single program, and may support a single process. In some implementations, virtual machine 424-2 may execute on behalf of a user (e.g., user device 410), and may manage infrastructure of cloud computing environment 422, such as data management, synchronization, or long-duration data transfers.

Virtualized storage 424-3 includes one or more storage systems and/or one or more devices that use virtualization techniques within the storage systems or devices of computing resource 424. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 424-4 may provide hardware virtualization techniques that allow multiple operating systems (e.g., "guest operating systems") to execute concurrently on a host computer, such as computing resource 424. Hypervisor 424-4 may present a virtual operating platform to the guest operating systems, and may manage the execution of the guest operating systems. Multiple instances of a variety of operating systems may share virtualized hardware resources.

Network 430 includes one or more wired and/or wireless networks. For example, network 430 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

FIG. 5 is a diagram of example components of a device 500. Device 500 may correspond to user device 410 and/or platform 420. As shown in FIG. 5, device 500 may include a bus 510, a processor 520, a memory 530, a storage component 540, an input component 550, an output component 560, and a communication interface 570.

Bus 510 includes a component that permits communication among the components of device 500. Processor 520 may be implemented in hardware, firmware, or a combination of hardware and software. Processor 520 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 550 includes a component that permits device 500 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator). Output component 560 includes a component that provides output information from device 500 (e.g., a display, a speaker, and/or one or more light-emitting diodes (LEDs)).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, or the like.

Device 500 may perform one or more processes described herein. Device 500 may perform these processes in response to processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software. The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

In embodiments, any one of the operations or processes of FIGS. 1, 2A, 2B, and 3 may be implemented by or using any one of the elements illustrated in FIGS. 4 and 5. It is understood that other embodiments are not limited thereto, and may be implemented in a variety of different architectures (e.g., bare metal architecture, any cloud-based architecture or deployment architecture such as Kubernetes, Docker, OpenStack, etc.).

According to example embodiments, no-coverage areas and/or new growth areas are identified, to assist in generating a new growth polygon area for optimizing coverage to areas currently without coverage.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a microservice(s), module, segment, or portion of instructions, which comprises one or more executable instructions for implementing the specified logical function (s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method, performed by at least one processor, for identifying new growth areas in a telecommunications network, the method comprising:
    obtaining first data from a first data source;
    obtaining second data from a second data source;
    combining the first data and the second data into third data;
    based on the third data, creating a grid including tiles having a first area and a first characteristic; and generating a new growth area polygon based on a number of the tiles having the first area and the first characteristic,
wherein the generating the new growth area polygon comprises:
identifying a midpoint for each edge of each tile having the first area and the first characteristic, and generating a line between the midpoint of each tile having the first characteristic and the first area; or
generating a line surrounding an outside edge of every tile having the first characteristic and the first area.

2. The method of claim 1, wherein the generating the new growth area polygon comprises:
identifying the midpoint for each edge of each tile having the first area and the first characteristic;
generating the line between the midpoint of each tile having the first characteristic and the first area;
determining an area of the new growth area polygon; and
transmitting the area of the new growth area polygon to a telecommunications network operator.

3. The method of claim 1, wherein the generating the new growth area polygon comprises generating the line surrounding the outside edge of every tile having the first characteristic and the first area;
determining an area of the new growth area polygon; and
transmitting the area of the new growth area polygon to a telecommunications network operator.

4. The method of claim 1, wherein the first data is drive test data and the second data is geographic data.

5. The method of claim 1, further comprising transmitting the new growth area polygon to a telecommunications network operator.

6. The method of claim 1, wherein the first characteristic is being a no coverage area.

7. The method of claim 6, wherein determining the tile is a no coverage area comprises determining the tile comprises an RSRP value below a predetermined threshold.

8. An apparatus for identifying new growth areas in a telecommunications network, the apparatus comprising:
a memory storing instructions; and
at least one processor configured to execute the instructions to:
obtain first data from a first data source;
obtain second data from a second data source;
combine the first data and the second data into third data;
based on the third data, create a grid including tiles having a first area and a first characteristic; and
generate a new growth area polygon based on a number of the tiles having the first area and the first characteristic,
wherein the at least one processor is further configured to:
identify a midpoint for each edge of each tile having the first area and the first characteristic, and generate a line between the midpoint of each tile having the first characteristic and the first area; or
generate a line surrounding an outside edge of every tile having the first characteristic and the first area.

9. The apparatus of claim 8, wherein the at least one processor is further configured to:
identify the midpoint for each edge of each tile having the first area and the first characteristic;
generate the line between the midpoint of each tile having the first characteristic and the first area;
determine an area of the new growth area polygon; and
transmit the area of the new growth area polygon to a telecommunications network operator.

10. The apparatus of claim 8, wherein the at least one processor is further configured to:
generate the line surrounding an outside edge of every tile having the first characteristic and the first area;
determine an area of the new growth area polygon; and
transmit the area of the new growth area polygon to a telecommunications network operator.

11. The apparatus of claim 8, wherein the first data is drive test data and the second data is geographic data.

12. The apparatus of claim 8, wherein the at least one processor is further configured to transmit the new growth area polygon to a telecommunications network operator.

13. The apparatus of claim 8, wherein the first characteristic is being a no coverage area.

14. The apparatus of claim 13, wherein the at least one processor is further configured to determine the tile comprises an RSRP value below a predetermined threshold.

15. A non-transitory computer-readable recording medium having recorded thereon instructions executable by at least one processor, for identifying new growth areas in a telecommunications network, the method comprising:
obtaining first data from a first data source;
obtaining second data from a second data source;
combining the first data and the second data into third data;
based on the third data, creating a grid including tiles having a first area and a first characteristic; and
generating a new growth area polygon based on a number of the tiles having the first area and the first characteristic,
wherein the generating the new growth area polygon comprises:
identifying a midpoint for each edge of each tile having the first area and the first characteristic, and generating a line between the midpoint of each tile having the first characteristic and the first area; or
generating a line surrounding an outside edge of every tile having the first characteristic and the first area.

* * * * *